Feb. 10, 1959

D. M. RICHEY 2,872,903

FLUID LOCK VALVE

Filed Nov. 13, 1956

INVENTOR

David M. Richey

BY *Rockwell & Bartholow*

ATTORNEYS

Feb. 10, 1959　　D. M. RICHEY　　2,872,903
FLUID LOCK VALVE
Filed Nov. 13, 1956　　2 Sheets-Sheet 2
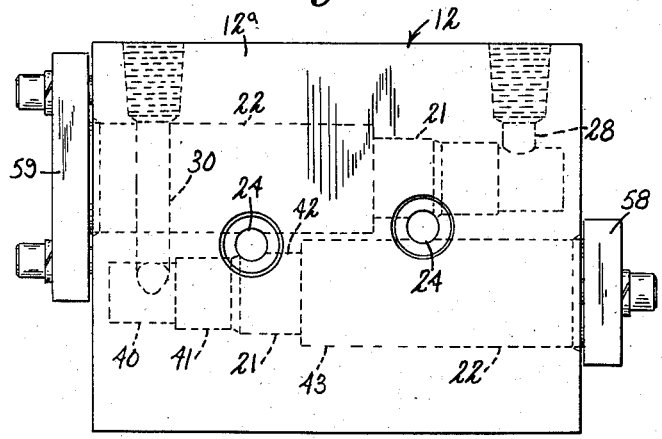
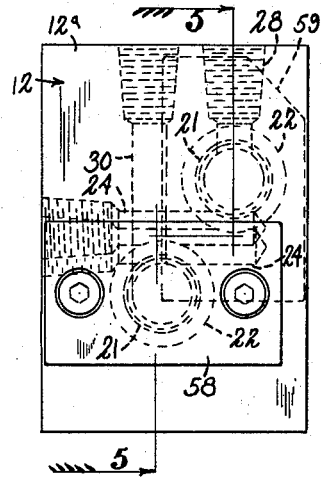
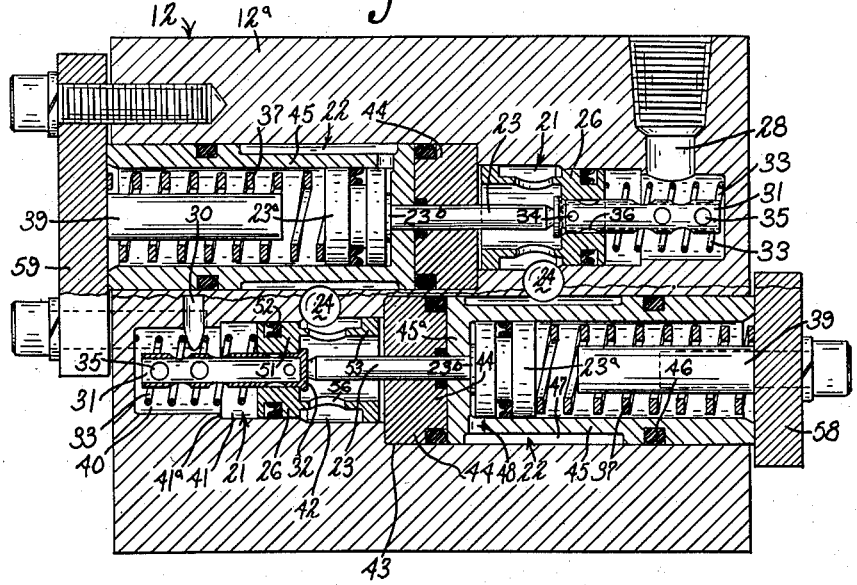
INVENTOR
David M Richey
BY
ATTORNEYS United States Patent Office 2,872,903
Patented Feb. 10, 1959

2,872,903

FLUID LOCK VALVE

David M. Richey, Woodbridge, Conn., assignor, by mesne assignments, to Emhart Manufacturing Company, Hartford, Conn., a corporation of Delaware Application November 13, 1956, Serial No. 621,956

7 Claims. (Cl. 121—40)

This invention relates to valves, and relates more particularly to a valve for controlling the ingress and egress of hydraulic fluid to the ends of a hydraulic cylinder in which cylinder a piston is reciprocable to transmit motion to a working part. While not limited thereto, the valve is employed in a hydraulically operated boom structure such as the structure illustrated and described in my co-pending U. S. application Serial No. 572,037, filed March 16, 1956. The valve of the present invention is an improvement of the valve shown in the co-pending application.

One object of the invention is to provide an improved valve such as characterized above, which enables reciprocating motion of the piston without intermittent interruptions or a number of starts.

Another object of the invention is to provide a valve which effectively inhibits the passage of hydraulic fluid past the valve when the latter is closed.

Another object of the invention is to provide a valve having self-operating means to vary the flow of hydraulic fluid through the valve in accordance with the pressure of the fluid.

Still another object of the invention is to provide a valve such as characterized above, having pressure-relief means to inhibit rupture of the fluid lines.

Further objects of the invention will be apparent from the following detailed description of the valve shown in the drawings by way of example.

In the drawings:

Fig. 3 is a side elevational view of the valve;

Fig. 4 is an end elevational view of the valve; and

Fig. 5 is a sectional view taken on line 5—5 of Fig. 4 and illustrating the valve on a somewhat larger scale.

Figure 1:
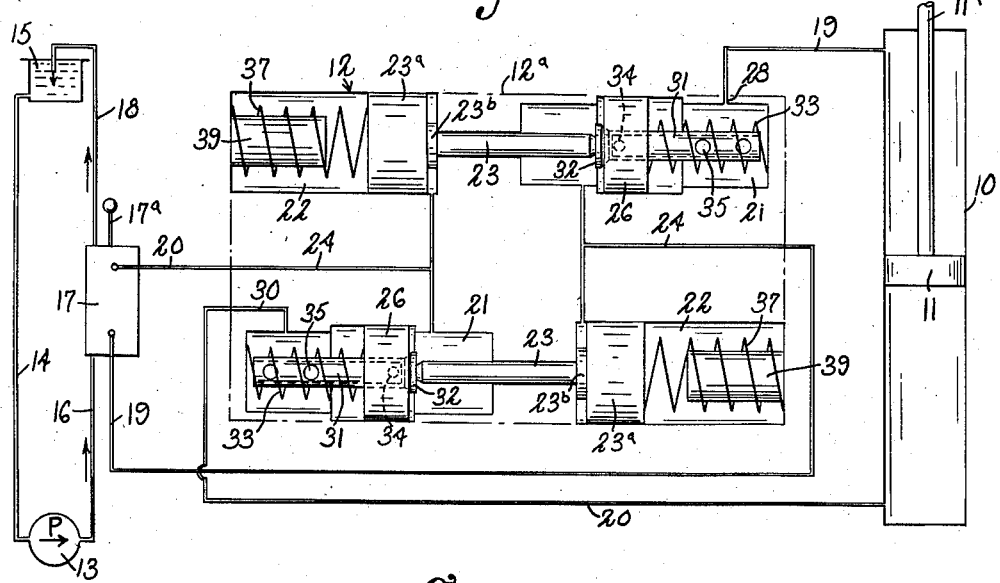
Fig. 1 is a diagrammatic view illustrating the valve of the invention employed in a system including a hydraulic cylinder, the parts of the valve being shown in position to close the fluid lines to the respective ends of the hydraulic cylinder.
Figure 2:
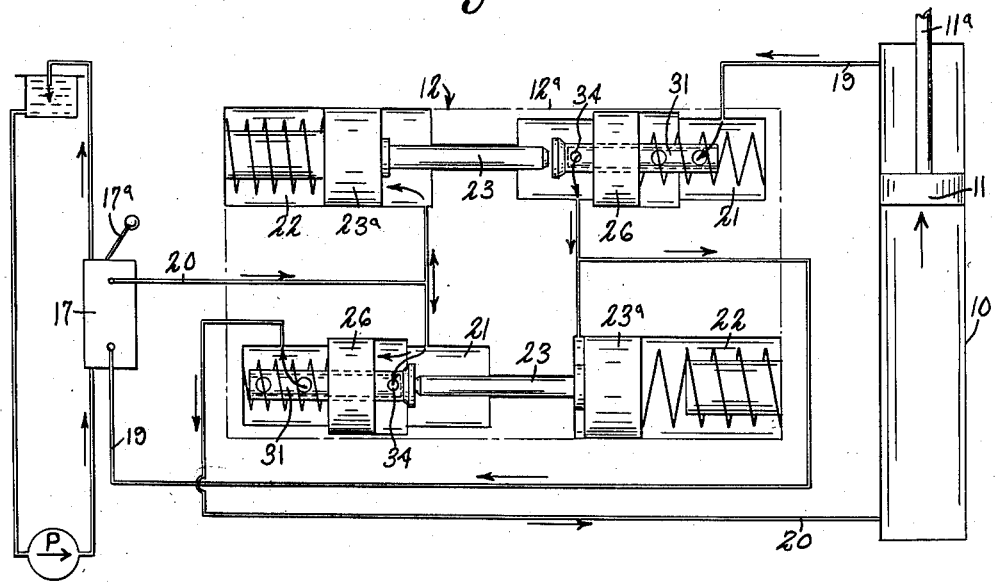
Fig. 2 is a similar view and illustrates the parts of the valve in position to admit hydraulic fluid to one end of the cylinder while hydraulic fluid is exhausted from the other end.

In the diagrammatic views shown in Figs. 1 and 2, the hydraulic cylinder is indicated at 10, and the piston reciprocable in the cylinder 10 to transmit motion to a working part (not shown) is indicated at 11. The valve of the invention interposed in the hydraulic system is indicated generally at 12. The hydraulic system includes a pump 13 having its suction side connected by means of a conduit 14 to a fluid reservoir 15. The pressure side of the pump is connected by a conduit 16 to a conventional manually operable control valve 17. The valve 17 is provided with a manually operable control lever 17a, and the last-mentioned valve and the reservoir 15 are interconnected by a conduit 18 for returning hydraulic fluid to the reservoir. As shown in Figs. 1 and 2, the valve 17 is connected to the upper end of the cylinder 10 through a conduit 19 interrupted by the valve block 12a of the valve 12, and the valve 17 is connected to the lower end of the cylinder 10 through a conduit 20 interrupted by the valve block 12a, the arrangement being such that fluid may be admitted to or exhausted from each end of the cylinder 10. It will be understood, of course, that when fluid is being admitted to one end of the cylinder 10 to impart motion to the piston 11 in one direction, fluid is exhausted from the other end of the cylinder 10.

As shown in Figs. 1 and 2, the valve block 12a, which is preferably formed of aluminum alloy, is provided with two reversely arranged primary fluid cylinders 21. The block 12a is also provided with two reversely arranged secondary fluid cylinders 22, each cylinder 22 being axially aligned with one cylinder 21. Two plungers 23 are slidable in the block 12a, each plunger 23 extending from one cylinder 22 into one end of the corresponding cylinder 21.

As shown in Figs. 1 and 2, the conduits 19 and 20, extending between the valve 17 and the upper and lower ends of the cylinder 10, respectively, and interrupted by the valve block 12a, communicate with two fluid passages 24 formed in the block. One of the fluid passages 24 communicates with the end of one cylinder 21 into which one of the plungers 23 extends, and communicates also with the corresponding end of the cylinder 22 from which the other plunger 23 extends. The other fluid passage 24 communicates in like manner with the other cylinder 21 and the other cylinder 22. Two piston members 26 are provided, the piston members 26 being disposed in the respective cylinders 21. The portion of the conduit 19 leading from the hydraulic cylinder 10 to the valve block 12a communicates with a fluid passage 28 formed in the block and extending into one cylinder 21 at the side of the corresponding piston member 26 remote from the fluid passage 24 which communicates with the last-mentioned cylinder 21. The portion of the conduit 20 leading from the hydraulic cylinder 10 to the valve block 12a communicates with a fluid passage 30 formed in the block and extending into the other cylinder 21 at the side of the corresponding piston member 26 remote from the fluid passage 24 extending into the last-mentioned cylinder. As shown diagrammatically in Figs. 1 and 2, each fluid passage 24 is branched to communicate with the corresponding cylinder 21 and the corresponding cylinder 22. However, this need not be done in actual practice as will appear hereinafter.

Each piston member 26 has a valve member 31 extending therethrough in axial relationship and slidable therein. The valve members 31 are formed as poppets and each is provided with an enlarged tapered head 32 cooperating with a seat formed by the corresponding piston member 26 to provide a dead fit with the valve head. Two relatively light compression springs 33 are provided, the compression springs 33 being disposed in the respective cylinders 21. Each spring 33 is disposed at the side of one piston member 26 remote from the plunger 23, the spring 33 being interposed between the last-mentioned side of the piston member 26 and the opposing end of the cylinder 21 and urging the piston member in a direction toward the plunger 23. It will be noted that each spring 33 embraces one of the valve members 31, the arrangement being such that the valve member may float lengthwise in the spring 33. The stem of each valve member 31 is hollow and is provided with a pair of diametrically opposite ports 34 adjacent the head 32. At the remote end portion, each valve stem is provided with a plurality of larger radial ports 35. The valve stems are open at the ends remote from the heads 32. The plungers 23 are engageable with the respective heads 32 to move the valve members 31 to their seated positions. The plungers 23 may be formed as integral parts of pilot pistons 23a disposed in the respective cylinders 22. Two compression springs 37, which are heavier than the compression springs 33, are disposed in the respective cylinders 22, each spring 37 being interposed between the face of one pilot piston 23a remote from the plunger 23 and the opposing end of the cylinder 22. A pair of cylindrical spacer elements 39 are provided to limit movement of the pilot pistons 23a in a direction away from the valve members 31, the spacers 39 floating in the respective springs 37 and being disposed in the cylinders 22 intermediate the faces of the pilot pistons 23a remote from the plungers 23 and the opposing ends of the cylinders.

Turning now to the details of the valve 12 as shown in Figs. 3, 4 and 5, it will be noted that the cylinders 21 are formed by two dead-end bores 40 reversely arranged in the valve block 12a, the bores 40 extending through the respective ends of the block. Each bore 40 is slightly enlarged outwardly of the closed end thereof, as at 41, the bore 40 being further enlarged, as at 42, adjoining and outwardly of the enlargement 41. It will be seen that the enlargement 41 is provided by a counterbore forming a shoulder 41a engageable by the piston member 26 to limit movement of the latter in a direction toward the closed end of the bore. Adjoining and outwardly of the enlargement 42 each bore 40 is further enlarged, as by a counterbore 43, to receive a fixed metal plug 44 bottoming in the counterbore 43. The plungers 23 extend through the respective plug members 44 in concentric relation, and the plug members 44 are provided with suitable packing to inhibit seepage of hydraulic fluid from one end of each bore 40 to the other.

Two sleeve members 45 are provided, the members 45 being received in the respective counterbores 43 and extending out of the block to a slight extent. The sleeve members 45 snugly embrace the respective pilot pistons 23a which are provided with suitable packing, the members 45 being provided with integrally formed end plates 45a at their inner ends abutting the respective plug members 44 and through which the respective plungers 23 extend. As shown in Fig. 5, each plug member 44, together with the corresponding sleeve member 45, separates one cylinder 21 from one cylinder 22. Each sleeve member 45 is provided with a relatively wide circumferential groove 47 communicating with a radial port 48 formed in the member 45 closely adjacent the end plate 45a. The circumferential grooves 47 formed in the members 45 are in direct communication with the respective fluid passages 24 which are formed as twin bores (see Figs. 3 and 4) extending into one side of the valve block 12a. The sleeve members 45 are provided with suitable packing, as at 46.

The piston members 26 are preferably of the form shown in Fig. 5. Each piston member 26 has a body portion 51 grooved circumferentially, as at 52, to receive packing. Each piston member 26 is provided with a tubular extension of somewhat smaller diameter than the body portion 51 and extending toward the corresponding plug member 44 from the body 51 and terminating in a radial flange 53 of larger diameter than the body 51, the flange 53 being closely received in the enlargement 42 of the bore 40. The flange 53 of each member 26 is engageable with the corresponding plug member 44 to limit movement of the piston member in a direction toward the member 44. As shown in Fig. 5, the tubular extension of each piston member 26 is provided with a plurality of radial openings 56 through which fluid may pass to and from the hollow stem of the corresponding valve member 31. As shown in the last-mentioned view, the extensions of the piston members 26 extend into the respective counterbores 42 which are in direct communication with the respective fluid passages 24.

As shown in Fig. 5, the stems of the valve members 31 are closely received in the respective piston members 26 and the ports 35 in each member 31 are arranged in diametrically opposite pairs, some of the pairs being spaced along a common plane passing through the axis of the member 31 while other pairs of ports 35 are spaced along a common plane normal to the first-mentioned plane and passing through the axis of the member 31. As shown in Fig. 5, the ports 35 extend approximately midway between the ends of the valve stems. As illustrated in the last-mentioned view, two diametrically opposite ports 36 are formed in each valve stem adjacent the diametrically opposite ports 34. The ports 36 which are of approximately the same size as the ports 35 are arranged on a diameter at right angles to the diameter on which the ports 34 are arranged.

As shown in Figs. 3 and 4, the above-mentioned fluid passage 28 in the block is constituted by a bore extending through the top of the valve block 12a and into the inner end portion of one of the bores 40. The above-mentioned fluid passage 30 is constituted by a similar bore extending through the top of the block and into the inner end of the other bore 40. As shown in the last-mentioned views, one of the bores 40 is formed in the block upwardly and slightly to one side of the other, the bores 40 being arranged adjacent one another. A cover plate 58 is secured to one end of the valve block 12a by suitable bolts and extends over and closes the open outer end of one of the sleeve members 45, and a cover plate 59 is similarly secured to the other end of the block and closes the open outer end of the other sleeve member 45. The cover plates 58 and 59 may be provided with suitable gaskets, not shown.

The operation of the valve 12 is as follows. When the piston 11 in the hydraulic cylinder is at rest and the manually operable control lever 17a of the valve 17 is in the neutral (see Fig. 1) position to direct fluid entering the valve 17 from the conduit 16 to the return conduit 18, the valve members 31 in the block 12a are normally closed. It will be understood that under these conditions movement of the piston 11 within the cylinder 10 is inhibited. Under these conditions the piston members 26 tend to remain in what may be called their rest positions (see Fig. 1) owing in part to the force applied to the respective members 26 by the light compression springs 33. Also under these conditions, the spring-urged pilot pistons 23a tend to remain in what may be termed their rest positions. When the pilot pistons 23a are in their rest positions the plungers 23 are maintained by the pistons 23a in their fully extended (Fig. 1) positions. It will be understood that when the plungers 23 are in their fully extended positions the heads 32 of the valve members 31 are engaged by the respective plungers 23 and each member 31 is maintained in one extreme (see Fig. 1) position. When each of the valve members 31 is in the last-mentioned extreme position and each piston member 26 is in the rest position thereof, the flow of hydraulic fluid to and from the cylinder 10 is positively cut off owing to the dead fit between the tapered head 32 of each member 31 and the valve seat provided by the corresponding piston member 26. This feature of the valve is a distinct advantage as it tends to reduce to a minimum seepage through and past the valve 12 when each valve member 31 is in said extreme position and each piston member 26 is in the rest position thereof. The pilot pistons 23a and the piston members 26 are shown in their rest positions in Fig. 5. As shown in the last-mentioned view, each valve member 31 is maintained in the closed or said extreme position thereof by the corresponding plunger 23 and under these conditions each member 31, through engagement with the corresponding piston member 26, maintains the tubular extension of the member 26 in slightly spaced relation from the corresponding plug member 44, the corresponding spring 33 being slightly compressed.

When the plungers 23 are in their fully extended positions, enlargements 23ᵇ (see Fig. 5) of the respective plungers abut the respective end plates 45ᵃ to thereby space the working faces of the respective pilot pistons 23ᵃ from the end plates 45ᵃ so that the ports 48 are not fully closed by the pilot pistons. As shown in Fig. 5, the ports 34 and the ports 36 in each member 31 are closed by one of the piston members 26 when the latter is in the rest position and the valve member 31 is closed.

When the manually operable lever 17ᵃ is moved from the neutral position of Fig. 1 to the position of Fig. 2, hydraulic fluid from the suction side of the pump is directed through the valve 17 to the conduit 20 communicating with one of the fluid passages 24 formed in the valve block 12ᵃ. The pressure of the fluid flowing from the last-mentioned passage 24 into the corresponding cylinder 22 (see Fig. 2) effects movement of the pilot piston 23ᵃ therein to retract the corresponding plunger 23 thereby permitting the valve member 31, which is engageable by the last-mentioned plunger, to follow the plunger under the influence of pressure exerted by fluid flowing from the cylinder 10 into the conduit 19 and the corresponding cylinder 21. It will be understood from the foregoing that the fluid flows from the conduit 19 into the last-mentioned cylinder 21 at the side of the piston member 26 remote from the last-mentioned plunger 23. The fluid flows into the open end of the stem of the last-mentioned valve member 31 and also flows into the stem through the ports 35, the pressure of the fluid effecting following movement of the valve member 31 in the direction of the last-mentioned plunger 23. The piston member 26, in which the valve member is slidable, also moves to a slight extent and follows the plunger 23 until it is stopped by the engagement of the extension thereof with the corresponding plug member 44. Further movement of the valve member 31 first uncovers the ports 34 in the valve stem and continued movement of the member 31 uncovers the ports 36, so that fluid may flow out of the valve stem at the other side of the piston member 26 and out of the cylinder 21. Fluid from the last-mentioned side of the piston member 26 flows out of the cylinder through the passage 24 connected to the conduit 19 which, under these conditions, directs the fluid to the valve 17 through which the fluid from the conduit 19 passes to the reservoir through the conduit 18.

Simultaneously with, or somewhat before, the above-described flow from the cylinder 10 to the reservoir fluid from the passage 24 connected to the conduit 20 passes to the other cylinder 21 (lower, as illustrated in Fig. 2) at the side of the piston member 26 at which the other plunger 23 is disposed, and the pressure of the fluid at the last-mentioned side of the piston member 26 effects movement of the latter in a direction away from the last-mentioned plunger 23 thereby further compressing the corresponding spring 33. It will be understood that the last-mentioned piston member 26 tends to move before movement of the last-mentioned pilot piston 23ᵃ is effected, owing to the lighter spring associated with the piston member 26. There is little or no tendency for the corresponding valve member 31 to follow the piston member 26 owing to the relatively small exposed surface area of the head 32, the head 32 tending to remain engaged with the plunger 23 which tends to remain stationary. This movement of the piston member 26 slidingly embracing the valve member 31 first uncovers the ports 34 of the valve stem and continued movement of the member 31 uncovers the ports 36 so that fluid may flow into the hollow stem not only through the ports 34 but through the ports 36 as well. The fluid flows out of the hollow stem at the other side of the piston member 26, the fluid flowing out the open end of the last-mentioned stem and also through the ports 35. The fluid then flows out of the last-mentioned cylinder 21 through the fluid passage 30, the fluid passing into the conduit 20 leading to the lower end of the hydraulic cylinder 10, as illustrated in Fig. 2.

The above-described flow of fluid through the system effects movement of the piston 11 in a direction to extend the piston rod 11ᵃ, thereby effecting upward swinging movement of a boom (not shown), for example. When the upward swinging movement of the boom is interrupted by the return of the manually operable lever 17ᵃ to the neutral position thereof, the fluid is sealed in the hydraulic cylinder 10 by the valve 12 to strongly inhibit sinking or lowering movement of the boom even though the gravitational pull on the boom may exert a substantial thrust on the piston 11. It will be understood from the foregoing that the valve 12 functions in a similar manner to restrain movement of the piston 11 in a direction to extend the piston rod 11ᵃ even though, under other conditions, there may be a substantial thrust on the rod 11ᵃ in the last-mentioned direction applied to the rod by a force of one kind or another externally of the hydraulic cylinder 10.

Thus when the operating lever 17ᵃ is in the neutral position of Fig. 1 and there is a force applied to the piston rod 11ᵃ externally of the cylinder 10 and tending to retract the rod, for example, the flow of fluid tending to escape from the lower end (see Fig. 1) of the cylinder is blocked by the lower (Fig. 1) valve member 31 which, under these conditions, is under the control of the lower spring-biased pilot piston 23ᵃ, as shown in Fig. 1. Under these conditions, the corresponding piston member 26 maintains the ports 34 and 36 in the last-mentioned member 31 in closed condition to prevent the flow of fluid through the member 31. The pressure of the spring 37 on the last-mentioned pilot piston may be such that under most conditions the valve member 31 is maintained in the last-mentioned position when the lever 17ᵃ is in the neutral position. A pressure on the pilot piston of approximately 100 pounds p. s. i. may be required, for example, to move the pilot piston in a direction to retract the corresponding plunger 23 so that the valve member 31 may open. This construction and arrangement also permits the last-mentioned valve member 31, for example, to act as the pressure-relief valve to inhibit rupture of the conduit 20 in the event that the fluid therein reaches an abnormally high pressure, as by an extreme rise in temperature for example.

It will be further understood that the spring pressure on the pilot pistons 23ᵃ urging the latter toward the respective valve members 31 may be predetermined. This pressure on the pilot pistons 23ᵃ is not subject to fluctuation such as might occur if, in addition to the pressure of the springs 37, the pilot pistons 23ᵃ were urged toward the respective valve members 31 by fluid pressure. Due to this feature the action of the valve members 31 is better controlled, thereby assuring smoother reciprocating motion of the piston 11 in the hydraulic cylinder. Furthermore, it will be seen that the position of the valve member through which the fluid escapes from the hydraulic cylinder 10 is controlled by the pressure of the fluid flowing to the cylinder 10, and more specifically, the pressure of the fluid in the cylinder 22 operatively associated with the plunger 23 which is engageable with the last-mentioned valve member 31. This feature is of special importance under conditions where fluid tends to escape from one end of the hydraulic cylinder 10 faster than fluid can be supplied by the pump to the other end of the cylinder 10. This tendency, which is effectively inhibited, arises when fluid is admitted to the cylinder 10 to move the piston 11 in one direction and at the same time a strong thrust is applied to the piston rod 11ᵃ externally of the cylinder 10 and in the same direction. It will also be seen that the flow through each valve member 31 is progressively increased as the valve member is moved relatively to the corresponding piston member 26 in a direction to open the valve member, owing to the size and location of the ports 34 and 36. This feature also facilitates smooth operation of the piston 11 without intermittent interruption or a number of starts.

It will be understood from the foregoing that when the manually operable lever 17ᵃ is moved from the position of Fig. 1 in a direction opposite the position of the lever 17ᵃ in Fig. 2, the flow through the valve 12 is the reverse of that shown diagrammatically in Fig. 2. Under these conditions the upper (Fig. 1) plunger 23 remains fully extended and the lower plunger 23 is retracted. Also under these conditions the upper piston member 26 is moved to the right by fluid pressure to uncover the ports 34 and 36 in the corresponding valve member 31 while the lower valve member 31 is moved to the right by fluid pressure to uncover the ports 34 and 36 in the latter.

In accordance with the foregoing disclosure there is provided an improved self-operating valve for controlling the ingress and egress of hydraulic fluid from the ends of a hydraulic cylinder in which a piston is reciprocable to transmit motion to a working part, which valve may be employed to particular advantage in a hydraulically operated boom structure. One advantage of the valve is that it enables smoother operating motion of the piston by inhibiting intermittent interruption of the piston movement. Another advantage of the valve is that it tends to reduce to a minimum the seepage of fluid past the valve when the latter is closed. A further advantage of the valve is that it is provided with means to vary the flow of hydraulic fluid through the valve in accordance with the pressure of the fluid. Furthermore, the valve is provided with pressure-relief means to inhibit rupture of the fluid lines in the system. Also in accordance with the disclosure, there is provided a valve such as characterized above having relatively few and rugged parts, which is very dependable in operation. It will be understood that, if desired, the valve of the invention may be built into a hydraulic cylinder to form, in effect, an integral part of the latter.

While only one form of the valve has been illustrated and described above, it will be apparent that the valve is susceptible of various changes without departing from the principles of the invention and the scope of the claims.

What I claim is:

1. In a valve mechanism for controlling the ingress and egress of fluid from a hydraulic cylinder, a pressure source, means defining fluid passages from the pressure source to the respective ends of the hydraulic cylinder, primary means interposed in each fluid passage normally closing the passage and responsive to fluid pressure to open the passage when fluid flows in the latter in one direction or the other, and secondary means interposed in each one of said fluid passages and responsive to fluid pressure to control the primary means in the other fluid passage so that fluid may normally escape from the hydraulic cylinder through the other fluid passage only when the fluid pressure in said one of the passages reaches a predetermined degree, to inhibit the formation of a vacuum in the hydraulic cylinder, the primary means comprising a spring-biased piston member and a poppet valve extending into the piston member and being slidable therein, and the secondary means comprising a spring-biased plunger engageable with the poppet valve.

2. In a valve mechanism for controlling the ingress and egress of fluid from a hydraulic cylinder, a pressure source, means defining fluid passages from the pressure source to the respective ends of the hydraulic cylinder, primary means interposed in each fluid passage normally closing the passage and responsive to fluid pressure to open the passage when fluid flows in the latter in one direction or the other, and secondary means interposed in each one of said fluid passages and responsive to fluid pressure to control the primary means in the other fluid passage so that fluid may normally escape from the hydraulic cylinder through the other fluid passage only when the fluid pressure in said one of the passages reaches a predetermined degree, to inhibit the formation of a vacuum in the hydraulic cylinder, the primary means comprising a piston member and a poppet valve extending into the piston member and being slidable therein, and the secondary means comprising a pilot piston having a fixed part engageable with the poppet valve, the pilot piston being spring urged toward the poppet valve and the piston member being spring urged toward said fixed part of the pilot piston.

3. In a valve mechanism for restricting the ingress and egress of fluid from a hydraulic cylinder, a pressure source, means forming a pair of primary cylinders, means forming a pair of secondary cylinders, a pair of piston members, one piston member being disposed in each of the primary cylinders, a pair of valve members extending through and being slidable in the respective piston members to control the flow of fluid through the piston members, each valve member being movable to open position by fluid pressure at one side of the corresponding piston member, a pair of pilot pistons, each pilot piston being disposed in one of the secondary cylinders and having a part extensible into one of the primary cylinders at the other side of the corresponding piston member, the last-mentioned part having operative means of connection with the corresponding valve member to control the position of the latter, each pilot piston being spring urged toward the corresponding valve member, each piston member being spring urged toward the corresponding pilot piston, means defining fluid passages connecting the ends of the hydraulic cylinder and the respective primary cylinders at the first-mentioned side of each piston member, and means defining a pair of fluid lines, each fluid line communicating with the pressure source and one primary cylinder at said other side of the piston member therein, and also communicating with the corresponding secondary cylinder from which said part of the pilot piston therein extends into the other primary cylinder, and the last-mentioned communication of each fluid line being at the side of the corresponding pilot piston at which said piston part is disposed, whereby, when fluid under pressure is directed through one of said fluid lines toward one end of the hydraulic cylinder the fluid pressure effects sliding movement of the corresponding piston member on the corresponding valve member so that fluid may pass through the last-mentioned piston member, the fluid pressure also effecting movement of the corresponding pilot piston whereby said part of the pilot piston is retracted so that the other valve member may be moved to open position under the influence of fluid under pressure escaping from the other end of the hydraulic cylinder.

4. In a valve mechanism for restricting the ingress and egress of fluid from a hydraulic cylinder, a pressure source, means forming a pair of primary cylinders, means forming a pair of secondary cylinders, a pair of piston members, one piston member being disposed in each of the primary cylinders, a pair of valve members extending through and being slidable in the respective piston members to control the flow of fluid through the piston members, each valve member being movable to open position by fluid pressure at one side of the corresponding piston member, a pair of plungers engageable with the respective valve members to control the positions of the latter, each plunger being extensible from one of the secondary cylinders into one of the primary cylinders at the other side of the corresponding piston member, a pair of pilot pistons, each pilot piston being disposed in one of the secondary cylinders and being operatively connected to one of said plungers, said piston members being spring-biased toward the respective plungers and said pilot pistons being spring-biased toward the respective piston members, means defining fluid passages connecting the ends of the hydraulic cylinder and the respective primary cylinders at the first-mentioned side of each piston member, and means defining a pair of fluid lines, each fluid line communicating with the pressure source and one primary cylinder at said other side of the piston member therein, and also communicating with the corresponding secondary cylinder from which the plunger extends into the other primary cylinder, and the last-mentioned communication of each fluid line being at the side of the corresponding pilot piston at which the plunger is disposed, whereby, when fluid under pressure is directed through one of said fluid lines toward one end of the hydraulic cylinder, the fluid pressure effects sliding movement of the corresponding piston member on the corresponding valve member so that fluid may pass through the last-mentioned piston member, the fluid pressure also effecting movement of the corresponding pilot piston whereby the plunger associated with the latter is retracted so that the other valve member may be moved to open position under the influence of fluid under pressure escaping from the other end of the hydraulic cylinder.

5. A valve mechanism as defined in claim 4, wherein each of the valve members is provided with a part which in the closed position of the valve member has a dead fit with a valve seat provided by the corresponding piston member, to strongly inhibit seepage of fluid past the valve member.

6. A valve mechanism as defined in claim 5, wherein said part of each valve member comprises a tapered head, the valve member also comprising a hollow stem portion provided with a plurality of radial ports extending along terminal parts thereof, so that fluid may flow through the stem portion, the stem portion being closely received in the corresponding piston member.

7. A valve mechanism as defined in claim 4, wherein the pilot pistons are more strongly biased toward the respective piston members than the piston members are biased toward the pilot pistons, so that the formation of a vacuum in the hydraulic cylinder is strongly inhibited.

References Cited in the file of this patent

UNITED STATES PATENTS

| | | |
|---|---|---|
| 2,412,053 | Lucien | Dec. 3, 1946 |
| 2,588,520 | Halgren et al. | Mar. 11, 1952 |
| 2,618,121 | Tucker | Nov. 18, 1952 |
| 2,756,724 | Stewart et al. | July 31, 1956 |

FOREIGN PATENTS

| | | |
|---|---|---|
| 644,545 | Germany | May 7, 1937 |
| 218,963 | Switzerland | Apr. 16, 1942 |
| 407,409 | Italy | Oct. 6, 1944 |